(12) United States Patent
Tanaka

(10) Patent No.: US 8,995,033 B2
(45) Date of Patent: Mar. 31, 2015

(54) IMAGE PROCESSING APPARATUS AND IMAGE PROCESSING METHOD

(71) Applicant: KYOCERA Document Solutions Inc., Osaka-shi, Osaka (JP)

(72) Inventor: Kunihiko Tanaka, Osaka (JP)

(73) Assignee: KYOCERA Document Solutions Inc., Osaki-shi (JP)

( * ) Notice: Subject to any disclaimer, the term of this patent is extended or adjusted under 35 U.S.C. 154(b) by 0 days.

(21) Appl. No.: 14/226,224

(22) Filed: Mar. 26, 2014

(65) Prior Publication Data

US 2014/0293381 A1 Oct. 2, 2014

(30) Foreign Application Priority Data

Mar. 28, 2013 (JP) ................................. 2013-069235

(51) Int. Cl.
*H04N 1/46* (2006.01)
*H04N 1/48* (2006.01)
*H04N 1/56* (2006.01)

(52) U.S. Cl.
CPC ................. *H04N 1/465* (2013.01); *H04N 1/48* (2013.01); *H04N 1/56* (2013.01)
USPC ............ 358/505; 358/518; 358/1.9; 382/176; 345/690

(58) Field of Classification Search
CPC ................ G09G 2320/0276; G09G 2320/064; G09G 2320/0646; G09G 2320/0653; G09G 2320/066; G09G 2330/021; G09G 2360/145; G09G 2360/16; G09G 3/3406; G09G 3/3611; H04N 1/00681; H04N 1/00721
USPC ........ 358/1.9, 466, 518, 3.01, 1.2, 1.12, 1.18, 358/448, 462, 463, 488; 345/102, 690, 87, 345/89; 382/100, 112, 169, 171, 176, 219, 382/289
See application file for complete search history.

(56) References Cited

U.S. PATENT DOCUMENTS

| 6,633,406 | B1 * | 10/2003 | Imaizumi et al. ............ 358/1.18 |
| 6,917,707 | B1 * | 7/2005 | Kubota ........................ 382/176 |
| 8,116,513 | B2 * | 2/2012 | Minami et al. ............... 382/100 |
| 8,265,345 | B2 * | 9/2012 | Gotoh et al. .................. 382/112 |
| 8,552,946 | B2 * | 10/2013 | Kurokawa et al. ............. 345/89 |
| 2009/0161172 | A1 * | 6/2009 | Mizutani ...................... 358/466 |
| 2010/0091331 | A1 * | 4/2010 | Kawamura ................... 358/3.01 |
| 2010/0253951 | A1 * | 10/2010 | Tsuzuki ........................ 358/1.2 |
| 2012/0092734 | A1 * | 4/2012 | Yamada ....................... 358/518 |
| 2014/0126005 | A1 * | 5/2014 | Hanawa ........................ 358/1.9 |

FOREIGN PATENT DOCUMENTS

JP 08274942 A 10/1996

* cited by examiner

*Primary Examiner* — Negussie Worku
(74) *Attorney, Agent, or Firm* — Alleman Hall McCoy Russell & Tuttle LLP

(57) ABSTRACT

An image processing apparatus includes an image data acquiring portion, an image determining portion, and an image data converting portion. The image data acquiring portion is configured to acquire first image data representing a color image. The image determining portion is configured to determine whether or not the image represented by the first image data is an image mainly composed of black characters. The image data converting portion is configured to convert the first image data to second image data by converting the first image data to binary image data when the image determining portion determines that the image represented by the first image data is an image mainly composed of black characters.

5 Claims, 6 Drawing Sheets

IMAGE PROCESSING APPARATUS AND IMAGE PROCESSING METHOD

INCORPORATION BY REFERENCE

This application is based upon and claims the benefit of priority from the corresponding Japanese Patent Application No. 2013-069235 filed on Mar. 28, 2013, the entire contents of which are incorporated herein by reference.

BACKGROUND

The present disclosure relates to an image processing apparatus and an image processing method for processing image data representing a color image.

Conventionally, there are known color copying machines and color multifunction peripherals having ACS (Auto Color Selection) function of automatically determining whether a document is a color document or a monochrome document. Also there is known a technique of determining, in reading an image of a document, whether the image of the document is a multilevel color image, a multilevel monochrome image, or a binary monochrome image, and regulating a charge accumulation time or a document reading speed of a color image sensor according to the determination result.

SUMMARY

An image processing apparatus according to one aspect of the present disclosure includes an image data acquiring portion, an image determining portion, and an image data converting portion. The image data acquiring portion is configured to acquire first image data representing a color image. The image determining portion is configured to determine whether or not the image represented by the first image data is an image mainly composed of black characters. The image data converting portion is configured to convert the first image data to second image data by converting the first image data to binary image data when the image determining portion determines that the image represented by the first image data is an image mainly composed of black characters.

An image processing method according to another aspect of the present disclosure includes an image data acquiring step, an image determining step, and an image data converting step. The image data acquiring step is a step of acquiring first image data representing a color image. The image determining step is a step of determining whether or not the image represented by the first image data is an image mainly composed of black characters. The image data converting step is a step of converting the first image data to second image data by converting the first image data to binary image data when it is determined in the image determining step that the image represented by the first image data is an image mainly composed of black characters.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
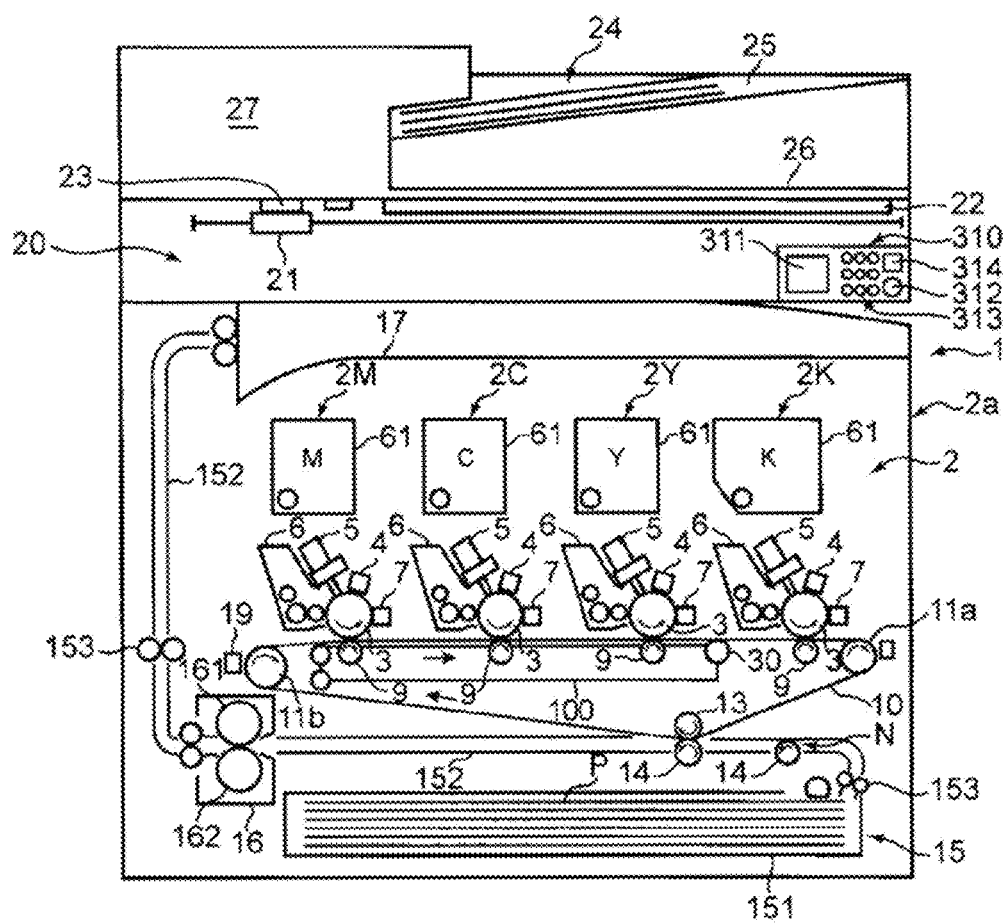
FIG. 1 is a cross-sectional view of a front surface of a structure of a multifunction peripheral according to one embodiment of the present disclosure.

In the following, a multifunction peripheral 1, as one example of an image processing apparatus according to an embodiment of the present disclosure, will be described based on the drawings. In the drawings, the elements denoted by the same reference numerals indicate the same elements, and the description thereof will be omitted. FIG. 1 is a cross-sectional view of a front surface of a structure of the multifunction peripheral 1 according to one embodiment of the present disclosure. As shown in FIG. 1, the multifunction peripheral 1 includes an image forming portion 2 inside an apparatus body 2a. The image forming portion 2 forms (prints) a color image on a paper sheet P.

In a front part of the multifunction peripheral 1, an operating portion 310 is provided. The operating portion 310 includes a start key 312 for allowing a user to input print execution instructions, a numerical keypad 313 for inputting the number of print copies, and the like, and a display portion 311, such as a liquid crystal display, for displaying, for example, operation guide information for copy operation and the like, and having a touch panel function for input of various settings thereof.

The image forming portion 2 includes image forming units 2M, 2C, 2Y, and 2K that are arranged in parallel for respective colors of magenta (M), cyan (C), yellow (Y) and black (K) inside the apparatus body 2a. The image forming portion 2 includes an intermediate transfer belt 10 that is extended between a plurality of rollers such as a driving roller 11a or a secondary transfer opposing roller 13 in the secondary scanning direction in image formation in an endlessly running manner. Further, the image forming portion 2 includes transfer rollers (transferring portion) 9 disposed at positions opposing photosensitive drums 3 of the image forming units 2M, 2C, 2Y, and 2K, respectively, with the intermediate transfer belt 10 interposed between the transfer rollers 9 and the photosensitive drums 3. Also, the image forming portion 2 includes: a secondary transfer roller 14 that contacts with the outer circumferential face of the intermediate transfer belt 10 in the part where the intermediate transfer belt 10 is extended on the secondary transfer opposing roller 13 and that transfers a toner image on the intermediate transfer belt 10 to a paper sheet P; and a belt cleaning device 19.

The image forming units 2M, 2C, 2Y and 2K each include a toner tank 61, the photosensitive drum 3 formed, for example, of amorphous silicon, a charging device 4, an exposure device 5, a developing device 6, and a drum cleaning device 7 which are disposed around the photosensitive drum 3. The image forming units 2M, 2C, 2Y and 2K each form a toner image corresponding to image data on the circumferential face of the photosensitive drum 3 and transfer the toner images to the intermediate transfer belt 10.

The toner tank 61 of the image forming unit 2M accommodates magenta toner, the toner tank 61 of the image forming unit 2C accommodates cyan toner, the toner tank 61 of the image forming unit 2Y accommodates yellow toner, and the toner tank 61 of the image forming unit 2K accommodates black toner. In this constitution, the image forming unit 2M forms a magenta toner image, the image forming unit 2C forms a cyan toner image, the image forming unit 2Y forms a yellow toner image, and the image forming unit 2K forms a black toner image.

The charging device 4 uniformly charges the circumferential face of the photosensitive drum 3 at a predetermined potential. The exposure device 5 applies, to the circumferential face of the photosensitive drum 3, laser light generated based on the image data transmitted from a controlling portion 111 described below, to form an electrostatic latent image on the circumferential face of the photosensitive drum 3. The developing device 6 operates to adhere the toner supplied from the toner tank 61 to the electrostatic latent image formed on the photosensitive drum 3 and visualizes the electrostatic latent image as a toner image. The drum cleaning device 7 removes the toner remaining on the circumferential face of the photosensitive drum 3 for cleaning after end of the primary transfer of the toner image to the intermediate transfer belt 10 as described below.

Below the image forming units 2M to 2K, the intermediate transfer belt 10 to which the toner image visualized on the circumferential face of the photosensitive drum 3 is to be intermediately transferred (primarily transferred) is disposed. The intermediate transfer belt 10 is extended between the driving roller 11a situated on the right side in FIG. 1, the follower roller 11b situated on the left side in FIG. 1, and the secondary transfer opposing roller 13 situated below the driving roller 11a and the follower roller 11b in an endlessly running manner, in the condition that the intermediate transfer belt 10 is pressed against the photosensitive drums 3 by the transfer rollers 9 disposed opposing the respective photosensitive drums 3.

The intermediate transfer belt 10 is driven by the driving roller 11a and runs endlessly between each of the above rollers. The toner image of each color formed on the photosensitive drum 3 is transferred to and superposed on the endlessly running intermediate transfer belt 10 in the order of M, C, Y, and K in appropriate timing. As a result, a color image including four colors, M, C, Y, and K is formed on the intermediate transfer belt 10. In the present embodiment, a monochrome toner image may be formed by forming an image just by the image forming unit 2K.

At the position opposing the follower roller 11b on the outer circumferential face of the intermediate transfer belt 10, the belt cleaning device 19 is provided. The belt cleaning device 19 removes (recovers) the toner remaining on the intermediate transfer belt 10.

The secondary transfer roller 14 applies a predetermined transfer bias to the paper sheet P according to the instruction from the controlling portion 111 described below, and secondarily transfers the color image on the intermediate transfer belt 10 to the paper sheet P.

The multifunction peripheral 1 includes a sheet feed portion 15 for feeding sheet toward the image forming units 2Y to 2K. The sheet feed portion 15 includes a sheet feed cassette 151 for accommodating paper sheets P, a sheet conveying path 152 in which the paper sheet P is conveyed, a conveyance roller 153 for conveying the paper sheet P in the sheet conveying path 152, and the like, and conveys the paper sheet P that is fed one by one from the sheet feed cassette 151 toward the position of the secondary transfer roller 14. The sheet feed portion 15 conveys, to the fixing device 16, the paper sheet P having been subjected to the secondary transfer process, and discharges the paper sheet P having been subjected to the fixing process, to a discharge tray 17 in an upper part of the apparatus body 2a.

The fixing device 16 is provided downstream of the secondary transfer roller 14 in the sheet conveying path 152, and fixes the toner image transferred to the paper sheet P. The fixing device 16 includes a heat roller 161 and a pressure roller 162, and melts the toner on the paper sheet P by heat of the heat roller 161, and fixes the toner on paper sheet P by applying pressure by the pressure roller 162.

In an upper part of the multifunction peripheral 1 body, a document reading portion 20 and a document feeding portion 24 are provided. The document reading portion 20 includes a scanner portion 21 (image data acquiring portion) having a CCD (Charge Coupled Device) sensor having a plurality of pixels, an exposure lamp, and the like, and a document table 22 and a document reading slit 23 formed of a transparent member such as glass. The scanner portion 21 is configured to be movable by a driving portion (omitted in the drawing), and is moved along the document surface at the position opposing the document table 22 in reading the document placed on the document table 22, and stores the acquired image data D1 (first image data) in a storage portion 32 described below while scanning the document image. The scanner portion 21 is moved to the position opposing the document reading slit 23 in reading the document fed by the document feeding portion 24, and acquires the image of the document through the document reading slit 23 in synchronization with the document conveying operation by the document feeding portion 24, and stores the image data D1 in the storage portion 32 described below.

The document feeding portion 24 includes a document placing portion 25 for placing a document, a document discharging portion 26 for discharging the document from which image has been read, and a document conveying mechanism 27 having a sheet feed roller, a conveyance roller (not illustrated) or the like for feeding documents placed on the document placing portion 25 one by one, conveying the documents to the position opposing the document reading slit 23 and discharging the documents to the document discharging portion 26. The document conveying mechanism 27 further includes a sheet reversing mechanism (not illustrated) for reversing the front and back faces of the document and conveying the document again to the position opposing the document reading slit 23, and making it possible to read images on both the faces of the document by the scanner portion 21 through the document reading slit 23.

The document feeding portion 24 is pivotable with respect to the multifunction peripheral 1 body in such a manner that its front face side is movable upward. A user is allowed to place a document to be read, for example, a book in a spread state on the top face of the document table 22 by moving upward the front face side of the document feeding portion 24 to open the top face of the document table 22.

Figure 2:
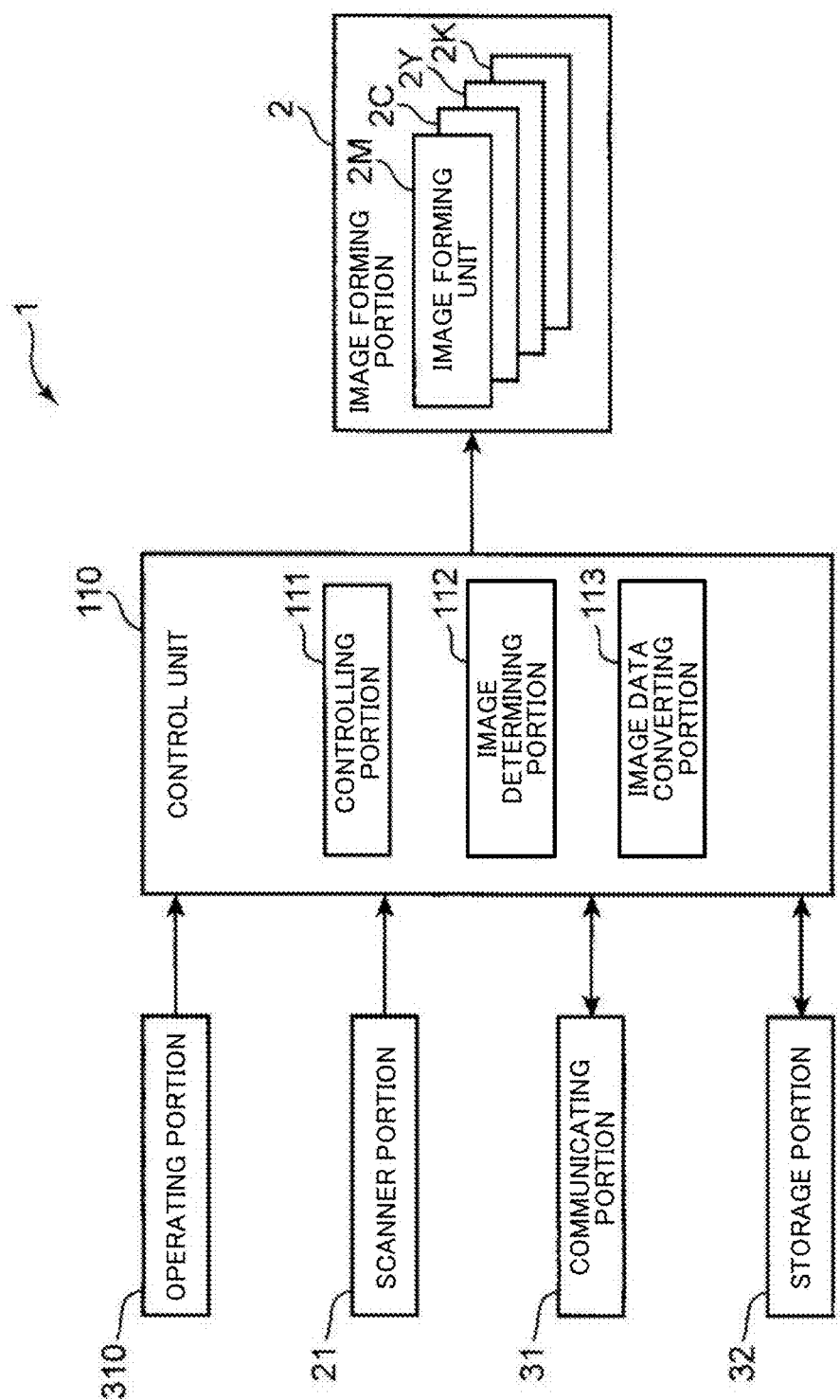
FIG. 2 is a block diagram showing the outline of an electric configuration of the multifunction peripheral shown in FIG. 1.

Next, a configuration of a control system of the multifunction peripheral 1 will be described. FIG. 2 is a block diagram showing the outline of an electric configuration of the multifunction peripheral 1.

A control unit 110 includes a CPU (Central Processing Unit) for executing, for example, a predetermined calculation process, a ROM (Read Only Memory) storing a predetermined control program, a RAM (Random Access Memory) for temporarily storing data, peripheral circuits thereof, and the like. The control unit 110 configures the controlling portion 111, an image determining portion 112, and an image data converting portion 113 by executing the control program stored in the ROM.

The controlling portion 111 is responsible for the overall operation control for the multifunction peripheral 1, and controls operation of each component of the apparatus. To the controlling portion 111, a communicating portion 31 (image data acquiring portion) and the storage portion 32 are connected.

The communicating portion 31 is a communication interface that is connectable to a communication network, for example, a LAN (Local Area Network) or a public line. The communicating portion 31 is able to transmit and receive data to/from an external terminal device such as a personal computer or another multifunction peripheral connected via a network that is omitted in the drawing. The communicating portion 31 receives the image data D1 (first image data) from the external terminal device connected via the network, and stores the image data D1 in the storage portion 32.

The storage portion 32 is a storage device formed by using, for example, an HDD (Hard Disk Drive) or a semiconductor memory.

The image determining portion 112 determines whether or not the image represented by the image data D1 is an image mainly composed of black characters based on the distribution of brightness of pixels of the image represented by the image data D1. The image mainly composed of black characters means an image in which an area ratio of the area in which black characters are formed to the entire image exceeds 90%.

Concretely, the image determining portion 112 generates a histogram which represents, as the class, brightness of pixels contained in the image data D1. The image determining portion 112 counts, as a first number of classes N1, the number of classes where the frequency indicated in the histogram exceeds a preset first threshold T1, and counts, as a second number of classes N2, the number of classes where the frequency indicated in the histogram is less than a second threshold T2 that is smaller than the first threshold T1. The image determining portion 112 determines whether or not the image represented by the image data D1 is an image mainly composed of black characters based on the ratio N1/N2 of the first number of classes N1 to the second number of classes N2.

For example, the image determining portion 112 determines that the image represented by the image data D1 is an image mainly composed of black characters when the ratio N1/N2 is less than a preset reference ratio Rref, and there are frequency peaks near a class lower limit and near a class upper limit in a range where the frequency of the histogram is not zero.

The image determining portion 112 may determine that the image represented by the image data D1 is an image mainly composed of black characters when the ratio N1/N2 is less than the preset reference ratio Rref regardless of a peak of frequency. Also, the first threshold T1 and the second threshold T2 may be the same value.

The image data converting portion 113 converts the image data D1 to image data D2 (second image data) by converting the image data D1 to binary image data of, for example, MMR (Modified Modified READ) format or JBIG (Joint Bi-level Image Experts Group) format when the image determining portion 112 determines that the image represented by the image data D1 is an image mainly composed of black characters. The image data converting portion 113 converts the image data D1 to the image data D2 by converting the image data D1 to multilevel image data of, for example, JPEG (Joint Photographic Expert Group) format when the image determining portion 112 determines that the image represented by the image data D1 is not an image mainly composed of black characters. Thus, image reproducibility is improved for an image that is not an image mainly composed of black characters.

Figure 3:
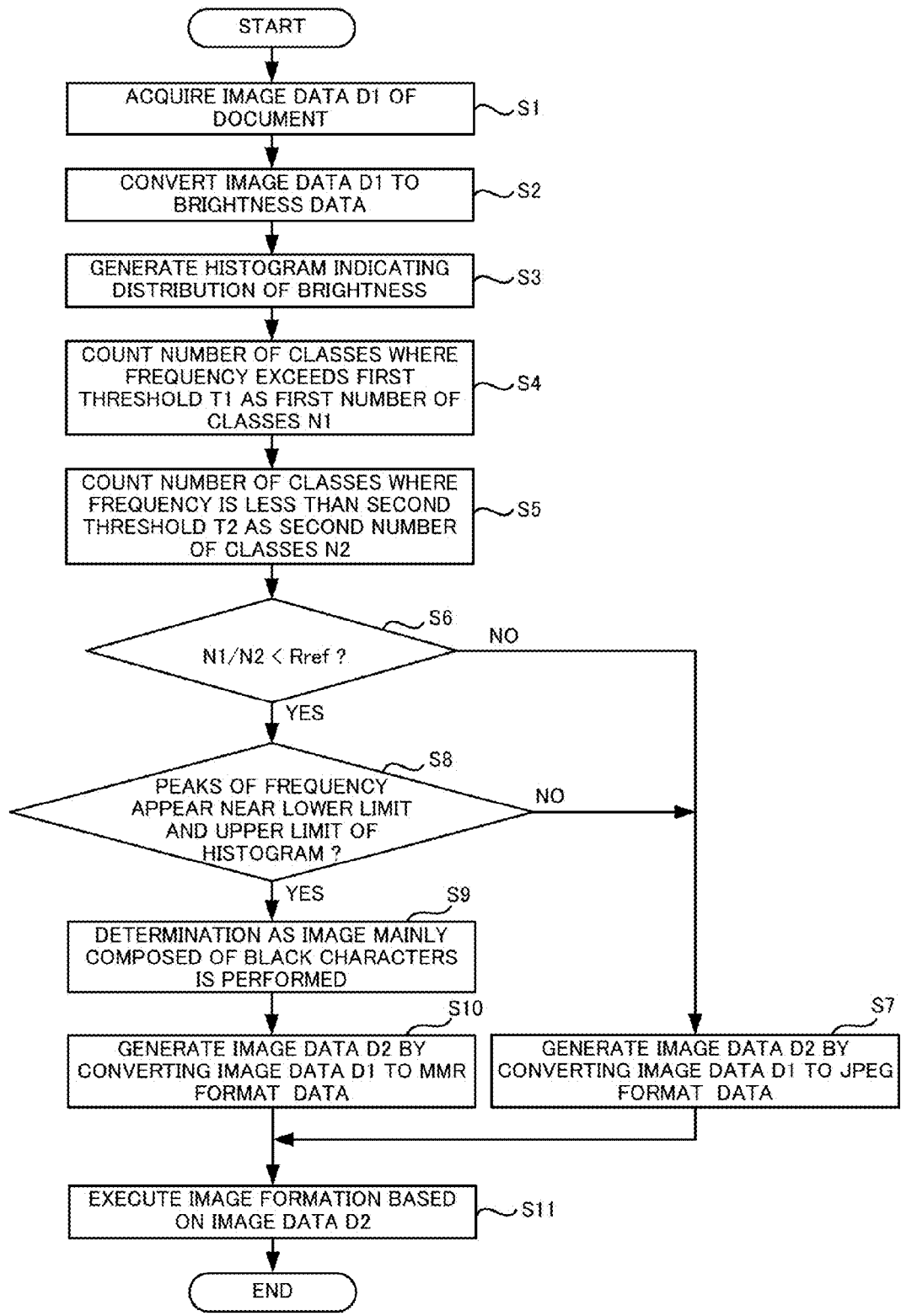
FIG. 3 is a flowchart showing one example of an operation of the multifunction peripheral shown in FIG. 2.

Next, an operation of the multifunction peripheral 1 configured as described above will be described. FIG. 3 is a flowchart showing one example of the operation of the multifunction peripheral 1 shown in FIG. 2. Firstly, an image of the document is read by the scanner portion 21, and the image data D1 representing the image of the document is acquired (step S1). The image data D1 may be received by the communicating portion 31 from an external terminal device via a network. The image data D1 is outputted to the controlling portion 111 from the scanner portion 21 or the communicating portion 31, and stored in the storage portion 32 by the controlling portion 111.

The image data D1 is, for example, image data of RGB format in which a color of each pixel is represented by combination of three pixel values corresponding to color components of red (R), green (G), and blue (B). The image data D1 may be, for example, image data of CMY format in which a color of each pixel is represented by combination of three pixel values corresponding to color components of cyan (C), magenta (M), and yellow (Y).

Next, the image data D1 stored in the storage portion 32 is referred to by the image determining portion 112, and the image data D1 is converted to brightness data Y representing brightness of pixels (step S2). Concretely, the image determining portion 112 converts the image data D1 of RGB format to the brightness data Y, for example, based on the following formula (1).

$$Y = 0.299 \times R + 0.587 \times G + 0.114 \times B \qquad (1)$$

When the image data D1 is image data of CMY format, the image determining portion 112 may convert the image data D1 to density data representing density of pixels.

Next, the image determining portion 112 generates a histogram representing distribution of brightness based on the brightness data Y (step S3).

Figure 4A:
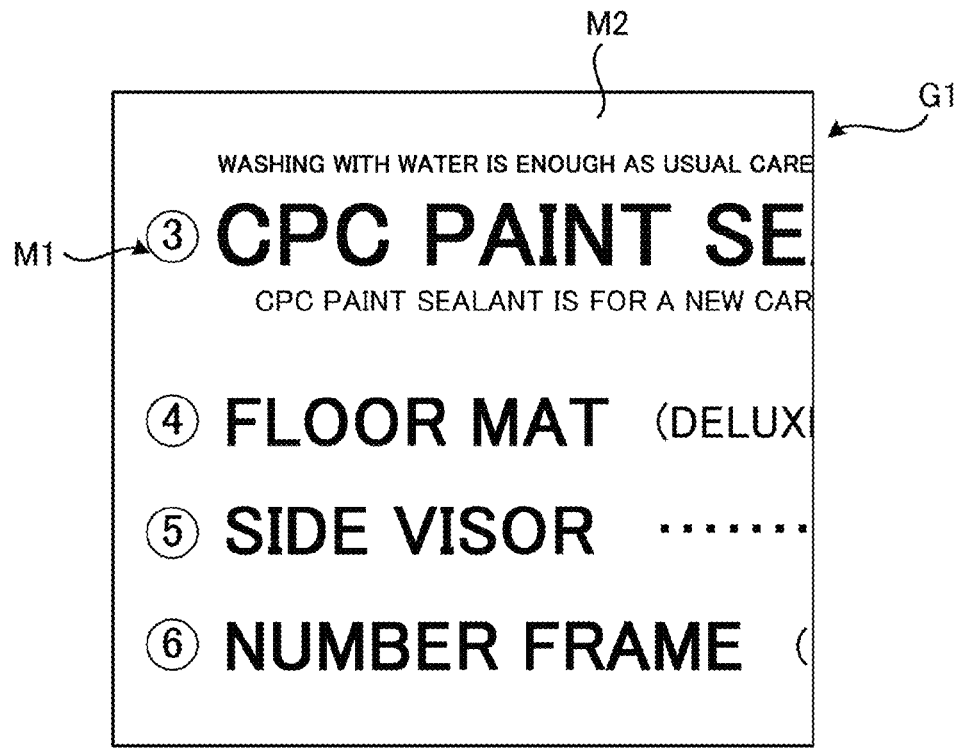
FIG. 4A illustrates an example of an image mainly composed of black characters.
Figure 4B:
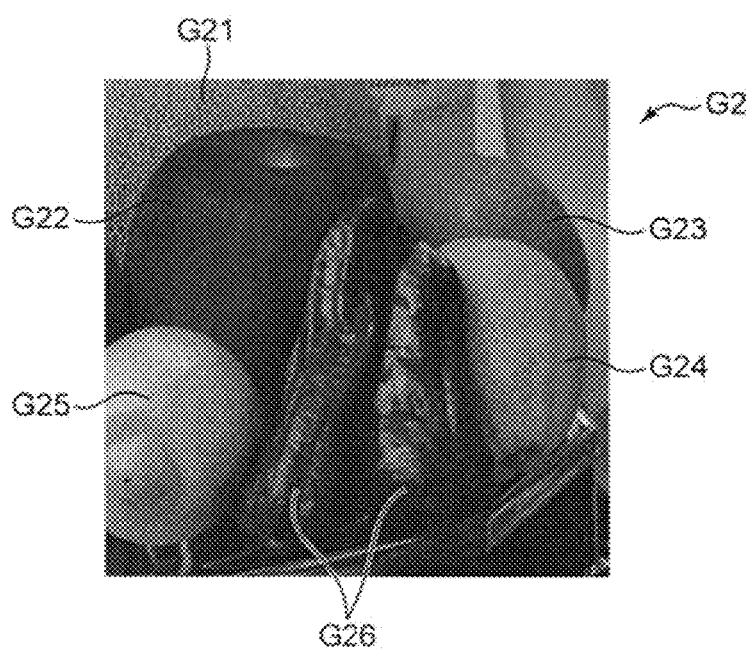
FIG. 4B illustrates an example of a photographic image.

FIG. 4A illustrates an example of an image mainly composed of black characters. FIG. 4B illustrates an example of a photographic image. As shown in FIG. 4A and FIG. 4B, only a part of the image is provided for illustration, but the image determining portion 112 may generate a histogram from the entire image represented by the image data D1.

Figure 5:
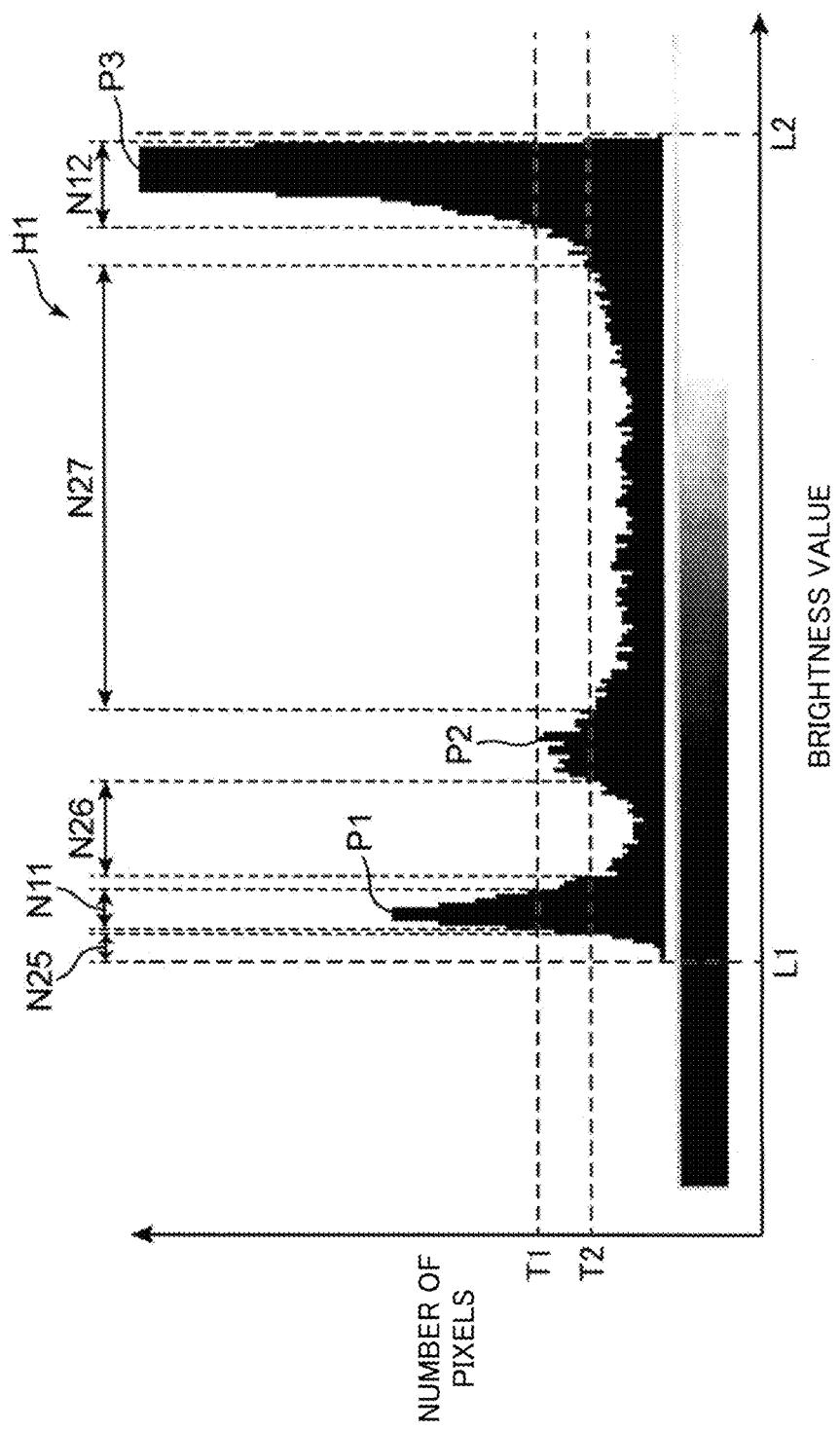
FIG. 5 illustrates a histogram of brightness of the image mainly composed of black characters shown in FIG. 4A.
Figure 6:
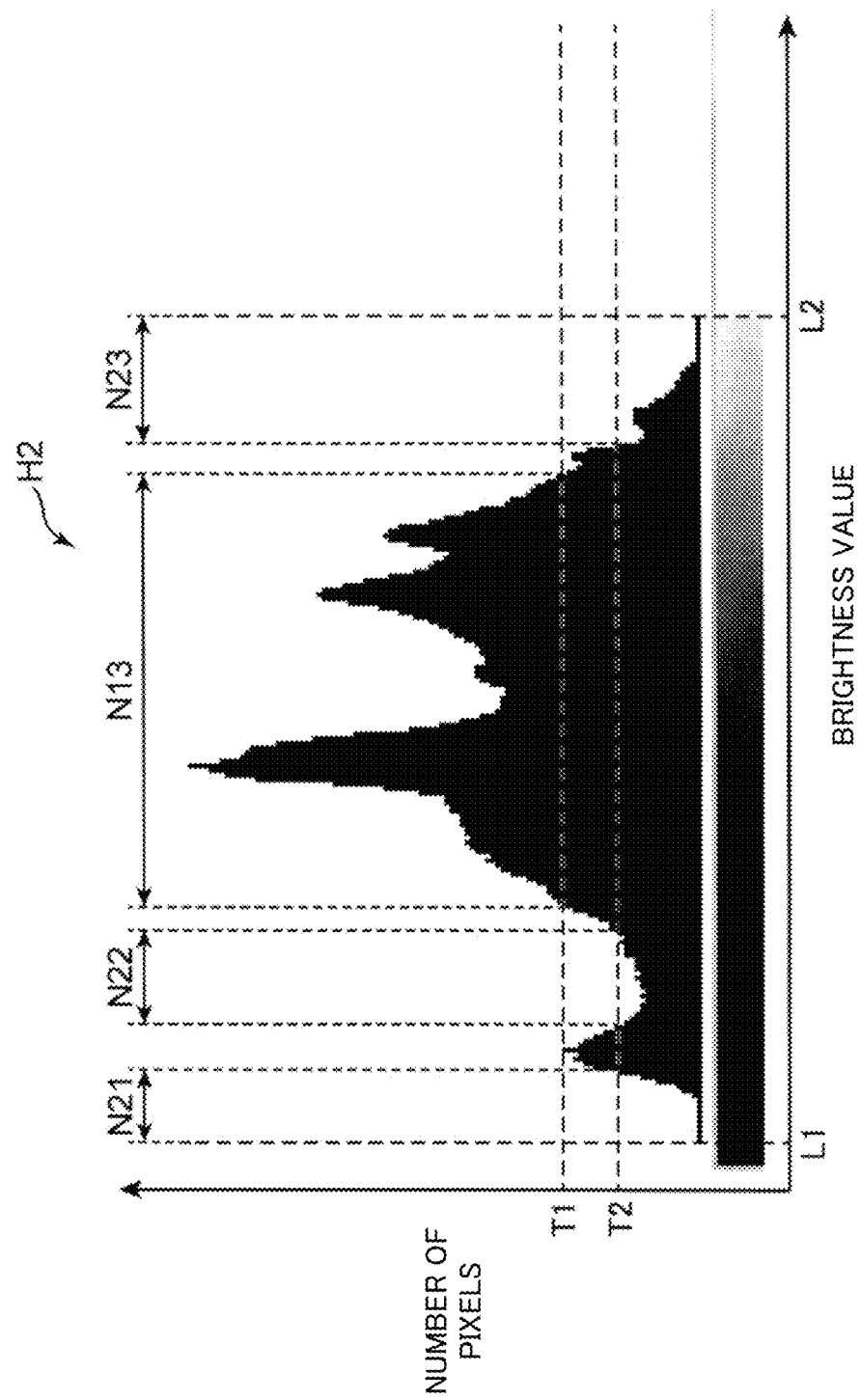
FIG. 6 illustrates a histogram of brightness of the photographic image shown in FIG. 4B.

FIG. 5 illustrates a histogram H1 of brightness of an image G1 mainly composed of black characters shown in FIG. 4A. FIG. 6 illustrates a histogram H2 of brightness of a photographic image G2 shown in FIG. 4B. In the histograms shown in FIG. 5 and FIG. 6, the horizontal axis represents a brightness value corresponding to the class, and the vertical axis represents the number of pixels corresponding to the frequency.

The image G1 shown in FIG. 4A contains, for example, blue color characters M2, and most of characters other than the color characters M2 are black characters M1. The background of the image G1 is white.

The histogram H1 of the image G1 includes, as shown in FIG. 5, a peak P1 corresponding to the black characters M1, a peak P2 corresponding to the color characters M2, and a peak P3 corresponding to the background (white color) of the image G1.

In the histogram H1 of the image G1, the peak P3 of high brightness corresponding to the white background part occupying the largest area in the image G1 is the largest, and the peak P1 corresponding to the black characters M1 is the second largest, and the peak P2 corresponding to the color characters M2 is small. Since the image G1 is mostly formed of the black characters M1 or the white background, the brightness values of the pixels contained in the image G1 are concentrated in the peak P1 of low brightness and the peak P3 of high brightness.

The peak P1 of low brightness is situated near a lower limit L1 of brightness value (class) within the range where the number of pixels (frequency) in the histogram H1 is not zero. The peak P3 of high brightness is situated near an upper limit L2 of brightness value (class) within the range where the number of pixels (frequency) in the histogram H1 is not zero. The "near the lower limit" means within 10% from the lower limit L1 in the range from the lower limit L1 to the upper limit L2, and "near the upper limit" means within 10% from the upper limit L2 in the range from the lower limit L1 to the upper limit L2.

The image G2 shown in FIG. 4B includes, for example, a brightness image G21 in which a pale green image is converted to brightness, a brightness image G22 in which a red image is converted to brightness, a brightness image G23 in which an orange-colored image is converted to brightness, brightness images G24 and G25 in which yellow images are converted to brightness, and a brightness image G26 in which a green image is converted to brightness.

As shown in FIG. 6, in the histogram H2 of the image G2, there is no peak of brightness value near the lower limit L1 and the upper limit L2, and a lot of peaks of brightness value appear in a middle area between the lower limit L1 and the upper limit L2.

Next, the image determining portion 112 counts, as the first number of classes N1, the number of classes (brightness value) in which the frequency (the number of pixels) exceeds the first threshold T1 (step S4). For example, in the histogram H1 shown in FIG. 5, the first number of classes N1 is obtained as the number of classes N11+the number of classes N12. In the histogram H2 shown in FIG. 6, the first number of classes N1 is the number of classes N13.

Next, the image determining portion 112 counts, as the second number of classes N2, the number of classes where the frequency is less than the second threshold T2 (step S5). In the histogram H1 shown in FIG. 5, the second number of classes N2 is obtained as the number of classes N25+the number of classes N26 +the number of classes N27. In the histogram H2 shown in FIG. 6, the second number of classes N2 is obtained as the number of classes N21+the number of classes N22+the number of classes N23.

Next, the image determining portion 112 compares N1/N2 which is the ratio of the first number of classes N1 to the second number of classes N2 with the reference ratio Rref (step S6).

In comparison between the histogram H1 of the image G1 mainly composed of black characters shown in FIG. 5, and the histogram H2 of the photographic image G2 shown in FIG. 6, the ratio N1/N2 for the histogram H1 is less than the ratio N1/N2 for the histogram H2. Thus, the inventors of the present disclosure have found that, in a histogram of an image mainly composed of black characters, the ratio N1/N2 is less than that for a histogram of an image such as a photograph or a painting. That is, the inventors have found that distribution of brightness of pixels representing an image varies depending on whether or not the image is an image mainly composed of black characters.

Based on such a finding, the image determining portion 112 determines that the image represented by the image data D1 is less likely to be an image mainly composed of black characters when the ratio N1/N2 is greater than or equal to the reference ratio Rref (NO in step S6), and the process is advanced to step S7 so as to execute a multilevel image processing suited for image processing for a photograph or a painting.

As to the values of the first threshold T1, the second threshold T2, and the reference ratio Rref, values that are suited for determining whether or not the image is an image mainly composed of black characters based on the ratio N1/N2 may be, for example, experimentally determined and appropriately set.

In step S7, the image data converting portion 113 converts the image data D1 to JPEG format data to generate the image data D2 (step S7), and, for example, stores the image data D2 in the storage portion 32, and the process is advanced to step S11.

On the other hand, the image determining portion 112 determines that the image represented by the image data D1 is more likely to be an image mainly composed of black characters when the ratio N1/N2 is less than the reference ratio Rref (YES in step S6), and the process is advanced to step S8 so as to enhance the accuracy of determining whether or not the image is an image mainly composed of black characters.

In step S8, the image determining portion 112 checks whether or not there are peaks of frequency (the number of pixels) near the lower limit L1 and the upper limit L2 in the histogram for an object to be processed (step S8).

The inventors have found that, in the histogram H1 of the image G1 mainly composed of black characters, as shown in FIG. 5, peaks of the number of pixels (frequency) appear near the lower limit L1 of brightness value (class) within the range where the number of pixels (frequency) of the histogram H1 is not zero, and near the upper limit L2 of the brightness value (class) within the range where the number of pixels (frequency) of the histogram H1 is not zero.

Based on such a finding, since the image represented by the image data D1 is less likely to be an image mainly composed of black characters when there is no peak of frequency (the number of pixels) near the lower limit L1 or near the upper limit L2 of the histogram for the object to be processed (NO in step S8), the image determining portion 112 advances the process step S7 so as to execute multilevel image processing suited for image processing for a photograph or a painting.

On the other hand, when there are peaks of frequency (the number of pixels) near the lower limit L1 and near the upper limit L2 of the histogram for the object to be processed (YES in step S8), the image determining portion 112 determines that the image represented by the image data D1 is an image mainly composed of black characters (step S9), and advances the process to step S10 so as to execute binary image processing suited for image processing for an image mainly composed of black characters.

In step S10, the image data converting portion 113 converts the image data D1 to, for example, MMR format data to generate the image data D2 (step S10), and, for example, stores the image data D2 in the storage portion 32, and the process is advanced to step S11.

As a result, it is possible to reduce the data quantity of the image data D2 representing an image in which a color image is partially mixed in the black character document. Therefore, it is possible to reduce the storage capacity of the storage portion 32 required for storing the image data D2, so that it is possible to reduce the cost of the storage portion 32.

On the other hand, in conventional arts, when a red or blue color character, or the like is partially contained in a black character document, or a red seal is stamped on a document containing only black characters, multilevel image data is generated because the document is determined as a multilevel color image document. The data quantity of the multilevel image data is large. However, in a case where an image contains a small color image, for example, in a case where a red or blue color character or the like is partially contained in a black character document, or in a case where a red seal is stamped on a document containing only black characters, there is a need of reducing the data quantity of the image data rather than increasing the color reproducibility.

The image data converting portion 113 may make a color image part and other black image part distinguishable, for example, by conducting an error diffusion process in converting the image data D1 to the binary image data.

Next, the controlling portion 111 causes the image forming portion 2 to form an image on the paper sheet P based on the image data D2 stored in the storage portion 32 (step S11), and ends the process.

The image determining portion 112 may convert the image data D1 to density data in step S2, and generate a histogram representing distribution of density in step S3. That is, the inventors have also found that distribution of density of pixels representing an image varies depending on whether or not the image is an image mainly composed of black characters. In this case, by arranging density values as classes in such a manner that the density value is high (dense) on the left side and the density value is low (sparse) on the right side in the drawings, instead of brightness values of the horizontal axis, in the histograms H1 and H2 shown in FIG. 5 and FIG. 6, it is possible to obtain histograms similar to the histograms H1 and H2.

Also, the image determining portion 112 may advance the process to step S9 without executing step S8 when the ratio N1/N2 is less than the reference ratio Rref (YES in step S6). However, the determination accuracy for image mainly composed of black characters is improved by execution of step S8 by the image determining portion 112.

The method for determining, by the image determining portion 112, whether or not the image is an image mainly composed of black characters is not limited to the method indicated by steps S3 to S6. The image determining portion 112 may determine whether or not the image represented by the image data D1 is an image mainly composed of black characters by using another determination method.

The image processing apparatus may not be an image forming apparatus having the image forming portion 2. For example, the image processing apparatus may be an image processing apparatus such as a scanner device that reads the image data D1 from a document and converts the image data D1 to the image data D2.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
an image data acquiring portion configured to acquire first image data representing a color image;
an image determining portion configured to determine whether or not the image represented by the first image data is an image mainly composed of black characters; and
an image data converting portion configured to convert the first image data to second image data by converting the first image data to binary image data when the image determining portion determines that the image represented by the first image data is an image mainly composed of black characters;
wherein the image determining portion determines whether or not the image represented by the first image data is an image mainly composed of black characters based on distribution of brightness or density of pixels of the image represented by the first image data; and
wherein the image determining portion generates a histogram in which classes represent the brightness or density of the pixels; counts, as a first number of classes, a number of the classes where a frequency indicated in the histogram exceeds a predetermined first threshold; counts, as a second number of classes, a number of the classes where the frequency indicated in the histogram is less than a second threshold that is smaller than or equal to the first threshold; and determines whether or not the image represented by the first image data is an image mainly composed of black characters based on a ratio between the first number of classes and the second number of classes.

2. The image processing apparatus according to claim 1, wherein the image determining portion determines that the image represented by the first image data is an image mainly composed of black characters when the ratio of the first number of classes to the second number of classes is less than a predetermined reference ratio, and there are peaks of the frequency near a class lower limit and near a class upper limit within a range where the frequency of the histogram is not zero.

3. The image processing apparatus according to claim 1, wherein the image determining portion determines that the image represented by the first image data is an image mainly composed of black characters when the ratio of the first number of classes to the second number of classes is less than a predetermined reference ratio.

4. The image processing apparatus according to claim 1, wherein the image data converting portion converts the first image data to the second image data by converting the first image data to multilevel image data when the image determining portion determines that the image represented by the first image data is not an image mainly composed of black characters.

5. The image processing apparatus according to claim 1, further comprising an image forming portion configured to form an image on a sheet based on the second image data.

* * * * *